United States Patent
Nan et al.

(10) Patent No.: US 8,700,023 B2
(45) Date of Patent: Apr. 15, 2014

(54) RELAYS IN TELECOMMUNICATIONS NETWORKS

(75) Inventors: MingKai Nan, Beijing (CN); Christopher Pudney, Newbury (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 834 days.

(21) Appl. No.: 12/660,621

(22) Filed: Mar. 2, 2010

(65) Prior Publication Data

US 2010/0227606 A1    Sep. 9, 2010

(30) Foreign Application Priority Data

| Mar. 3, 2009 | (GB) | 0903517.1 |
| Mar. 6, 2009 | (GB) | 0903877.9 |
| Mar. 6, 2009 | (GB) | 0903882.9 |
| Mar. 16, 2009 | (GB) | 0904479.3 |

(51) Int. Cl.
  *H04J 1/16* (2006.01)
(52) U.S. Cl.
  USPC ............ 455/422; 370/230; 370/231; 370/299
(58) Field of Classification Search
  USPC ................. 455/422; 370/230.1, 299, 210
  See application file for complete search history.

(56) References Cited

U.S. PATENT DOCUMENTS

| 8,265,128 B2 * | 9/2012 | Yu et al. ........................ 375/211 |
| 2009/0046573 A1 * | 2/2009 | Damnjanovic ................ 370/216 |
| 2009/0046582 A1 * | 2/2009 | Sarkar et al. ............... 370/230.1 |

OTHER PUBLICATIONS

3GPP TS 26.300 V8.7.0 (Dec. 2008), 3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 144 pp.
3G Release 6—3GPP TS 21.101 V6.9.0 (Mar. 2009), 3$^{rd}$ Generation Partnership Project; Technical Specification Group Services and System Aspects; Technical Specifications and Technical Reports for a UTRAN-based 3GPP system (Release 6), 31 pp.

(Continued)

*Primary Examiner* — Patrick Edouard
*Assistant Examiner* — Julio Perez
(74) *Attorney, Agent, or Firm* — Muirhead and Saturnelli, LLC

(57) ABSTRACT

In a telecommunications network including a mobile terminal in communication with a network base station, and at least one relay node that assists the base station with downlink data transmissions towards the mobile terminal, a method is provided of enabling coherent demodulation of a scheduled data block transmitted in the downlink by the base station and the at least one relay node. A reference signal is provided in the scheduled data block which is configured to change the mobile terminal from using cell specific reference signalling to using mobile terminal specific reference signalling to enable the mobile terminal to demodulate the scheduled data block transmitted in the downlink by the at least one relay node and the base station. Further, a method of performing synchronous retransmission of data includes transmitting pre-scheduling information for any required synchronous retransmission of a first data transmission by the relay node and the transmitting entity.

20 Claims, 3 Drawing Sheets

(56) References Cited

OTHER PUBLICATIONS

3G Release 8—3GPP TS 21.101 V8.0.0 (Mar. 2009), $3^{rd}$ Generation Partnership Project; Technical Specification Group Services and System Aspects; Technical Specifications and Technical Reports for a UTRAN-based 3GPP system (Release 8), 42 pp.

Research in Motion et al.: "L2 Relay Interference Mitigation", 3GPP Draft; R1-084102, $3^{rd}$ Generation Partnership Project (3GPP), Mobile Competence Centre; 650, Route Des Lucioles; F-06921 Sophia-Antipolis Cedex; France, no. Prague, Czech Republic; Nov. 4, 2008, XP050317404.

Nortel: "Control Channel and Data Channel Design for Relay Link in LTE-", 3GPP Draft; R1-090753 (Nortel-Relay Link Design in LTE-A), $3^{RD}$ Generation Partnership Project (3GPP), Mobile Competence Centre; 650, Route Des Lucioles; F-06921 Sophia-Antipolis Cedex; France, no. Athens, Greece; Feb. 4, 2009, XP050318616, Section 2.4.

\* cited by examiner

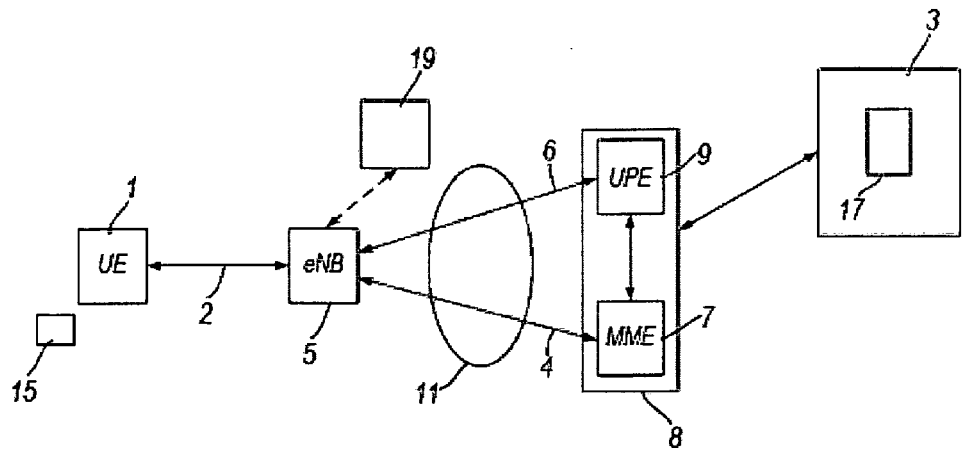
Fig.1
FIGURE 2
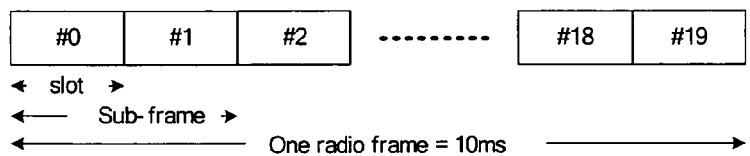
FIGURE 3
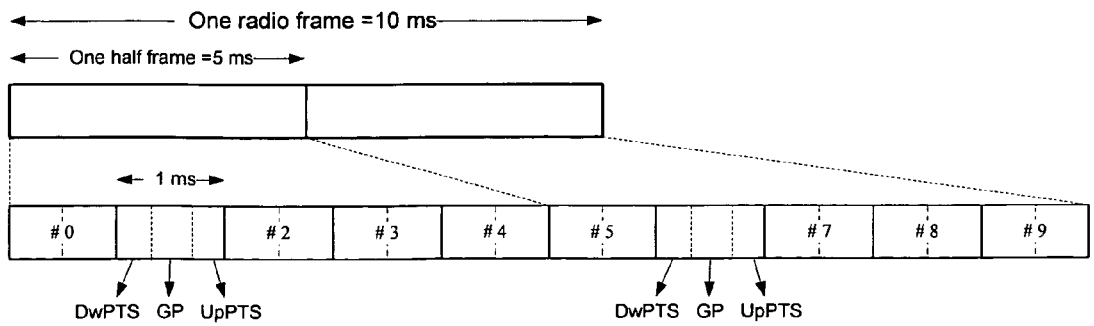

RELAYS IN TELECOMMUNICATIONS NETWORKS

TECHNICAL FIELD

The present invention relates to the use of relays in telecommunications networks. More particularly the present invention relates to the operation of relays in telecommunications networks, particularly LTE/SAE networks.

BACKGROUND

Relays are used in telecommunications networks to not only forward signals between mobile terminals and the core network, but to add power to the signal. An equivalent term for a relay is a repeater. These are employed in various types of telecommunication systems, including the Long Term Evolution (LTE)/System Architecture Evolution (SAE) currently being developed by the "3rd Generation Partnership Project" (3GPP). In this regard, Long Term Evolution (LTE) is an advanced version of UMTS that uses E-UTRA (Evolved Universal Terrestrial Radio Access), and which employs OFDMA (Orthogonal Frequency Division Multiple Access) on the downlink and SC-FDMA (Single Carrier Frequency Division Multiple Access) on the uplink.

The Radio Access Network component of the LTE/SAE is called the E-UTRAN, which comprises eNode Bs (eNBs). The eNBs provide both user plane and control plane (RRC) protocol terminations towards the mobile terminals (UEs) in the network. The eNBs are interconnected with each other by means of the X2 interface, and are also connected by means of the S1 interface to the EPC (Evolved Packet Core), more specifically to the MME (Mobility Management Entity) by means of the S1-MME and to the Serving Gateway (S-GW) by means of the S1-U. These are the channels over which communications are made in the network.

According to 3GPP TS 36.300, there is a functional split between the different elements of the LTE network, which is illustrated in FIG. 1. In particular, it is to be noted that eNBs control the dynamic allocation of resources (i.e. scheduling) to the UE in both the uplink and downlink.

Transmissions over such wireless uplink and downlink channels are subject to errors, for example due to receiver noise and unpredictable interference variations. Therefore, virtually all wireless communications systems employ some form of Forward Error Correction (FEC). The basic principle of forward error-correcting coding is to introduce redundancy in the transmitted signal. This is achieved by adding parity bits to the information bits prior to transmission (alternatively, the transmission could consists of parity bits alone, depending on the coding scheme used). In a further variation the parity bits may be "punctured" by removing some of the parity bits after encoding with an error correction code. The parity bits are computed from the information bits using a method given by the coding structure used. Thus, the number of bits transmitted over the channel is larger then the number of original information bits and a certain amount of redundancy has been introduced in the transmitted signal.

Another approach to handle transmissions errors is to use Automatic Repeat Request (ARQ). In an ARQ scheme, the receiver uses an error-detecting code, typically a Cyclic Redundancy Check (CRC), to detect if the received packet is in error or not. If no error is detected in the received data packet, the received data is declared error-free and the transmitter is notified by sending a positive acknowledgment (ACK). On the other hand, if an error is detected, the receiver discards the received data and notifies the transmitter via a return channel by sending a negative acknowledgment (NAK). In response to a NAK, the transmitter retransmits the same information.

Hybrid ARQ (HARQ) is a combination of forward error-correcting coding and ARQ. HARQ uses forward error correcting codes to correct a subset of all errors and relies on error detection to detect uncorrectable errors. Erroneously received packets are discarded and the receiver requests retransmissions of corrupted packets.

Whilst these techniques do improve the transmission efficiency, there is still room for improvement. This is particularly the case in modern mobile communications networks, where users are demanding higher data rates. At present, typically only those mobile terminals that are in close proximity to a base station (eNB) can achieve a high data rate, as interference affects the data rate as the distance between the base station and the user terminal increases.

The use of relay nodes has been proposed to distribute the data rate more evenly in a cell served by a particular base station. This approach uses one or more relays for a single transmission. Whilst such a relay system can greatly increase the data throughput, an inherent problem with relay nodes (RN) is that in most situations, a given node cannot simultaneously transmit and receive at the same frequency band, due to the transmitting and receiving antennas not being well separated. Therefore each RN is not able to listen while transmitting, and vice versa, which introduces restrictions on their operation.

A further problem for LTE networks is that since LTE needs to be compatible with both LTE compatible terminals and legacy terminals (such as Rel-8 terminals to which relays are transparent), there is a challenge to integrate relays in such a network environment without unduly increasing network signalling.

It is therefore desirable to devise an improved mechanism for incorporating relay nodes into mobile networks.

SUMMARY OF THE INVENTION

According to a first aspect the present invention provides, in a telecommunications network including a mobile terminal in communication with a network base station, and at least one relay node configured to assist the base station with downlink data transmissions towards the mobile terminal, a method of enabling coherent demodulation of a scheduled data block transmitted in the downlink by the base station and the at least one relay node, the method including: providing a reference signal in the scheduled data block which is configured to change the mobile terminal from using a cell specific reference signal to using a mobile terminal specific reference signal, in order to enable the mobile terminal to demodulate the scheduled data block transmitted in the downlink by the at least one relay node and the base station.

This aspect of the invention therefore enables relays to be utilised with mobile terminals configured to use mobile terminal specific reference signal for demodulation. This aspect of the invention therefore overcomes the problem of the relays, which do not using cell specific reference signals, being able to send readable signals to UEs (which typically use cell specific reference signals for demodulation). This incompatibility is therefore advantageously overcome by instructing the mobile terminals to demodulate using a mobile specific reference signal, thereby enabling the signals from the relay to be utilised by the UE.

According to a second aspect, the present invention provides, in a telecommunications network including a mobile terminal in communication with a network base station, and at least one relay node configured to assist with communications between the base station and the mobile terminal, a method of performing synchronous retransmission of data by the intended recipient, the method including: transmitting pre-scheduling information for any required synchronous retransmission of a first data transmission by the relay node and the transmitting entity.

The pre-scheduling information may define a retransmission pattern that is in phase with the form of HARQ transmission scheme being utilised.

This second aspect of the invention therefore advantageously enables relays to be able to function synchronously with the transmitting entity, be it the mobile terminal transmitting to the base station, or the base station transmitting to one or more mobile terminals. This aspect of the invention is applicable to both compensating for data not properly received by the receiving device as well as to improve the efficiency of well received data (i.e. to boost throughput).

In another aspect of the invention, there is provided, in a telecommunications network including a mobile terminal in communication with a network base station, and at least one relay node configured to assist with communications between the base station and the mobile terminal, a method of performing synchronous HARQ retransmission of data not properly received by the mobile terminal or the base station, the method including: receiving a notification of a timing of a first transmission of data scheduled; receiving information defining a schedule for any required retransmission of the data; monitoring a communication resource at the scheduled timing in order to obtain the first data transmission; saving a copy of the data transmitted; and where retransmission of the data is required performing the one or more retransmissions according to the retransmission schedule.

BRIEF DESCRIPTION OF THE FIGURES

For a better understanding of the present invention embodiments will now be described by way of example with reference to the accompanying drawings in which:

FIG. 1 shows the elements of an SAE/LTE 4G network;

FIG. 2 shows a Type 1 frame structure applicable to FDD;

FIG. 3 illustrates Type 2 applicable to TDD;

DETAILED DESCRIPTION

Figure 4:
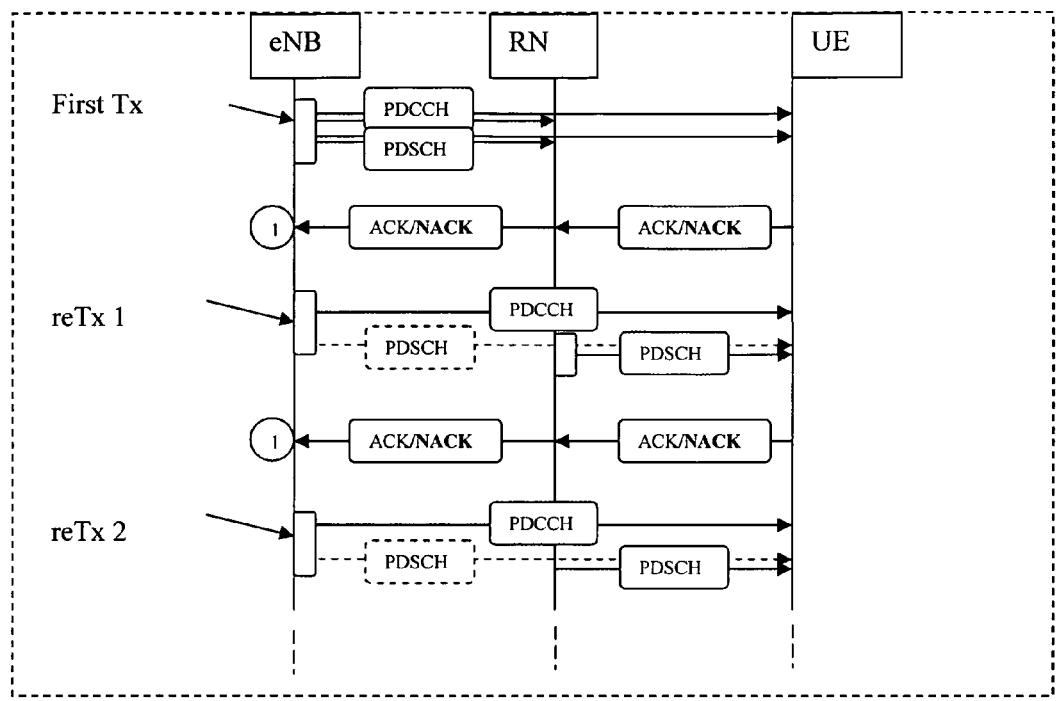
FIG. 4 illustrates a signalling diagram for a retransmission from a base station using a relay, useful for explaining the embodiments of the invention.

FIG. 1 shows schematically the logical elements of an LTE/SAE mobile telecommunications network. Mobile terminal (UE) 1 is registered with mobile telecommunications network core 3. The mobile terminal 1 may be any device with mobile communication capabilities, including a handheld mobile telephone, a personal digital assistant (PDA) a laptop or desktop personal computer—for example, equipped with a wireless datacard. Although only one mobile terminal 1 is shown in FIG. 1, there will in practice be a multiplicity of mobile terminals, each of which is registered with the network core 3.

The terminal 1 communicates wirelessly with the mobile telecommunications network core 3 via the radio access network (RAN) of the mobile telecommunications network core 3 over radio interface 2. The RAN comprises a plurality of eNodeBs (eNB) 5. Each eNodeB 5 performs functions generally similar to those performed by the NodeB and the radio network controller (RNC) of a 3G network. Each eNodeBs 5 serves a particular area or "cell". Each eNode B is coupled to an antenna device. The eNode B and antenna device form a cell site. The cell site provides radio coverage to a plurality of cells, e.g. three. Typically, the cell site will only provide radio coverage for a portion of each of the cells. Other portions of each of the cells are provided with radio coverage and by other cell sites.

Signalling in a mobile telecommunications network can be considered to be separated into user plane signalling and control plane signalling. The control plane performs the required control signalling, and includes the relevant application protocol and signalling bearer, for transporting the application protocol messages. Among other things, the application protocol is used for setting up the radio access bearer and the radio network layer. The user plane transmits data traffic and includes data streams and data bearers for the data streams. The data streams are characterised by one or more frame protocols specific for a particular interface. Generally speaking, the user plane carries data for use by a receiving terminal—such as data that allow a voice or picture to be reproduced—and the control plane controls how data are transmitted. A Packet Data Network Gateway (PDN-GW) terminates the user plane within the core 3.

A mobility management entity (MME) 7 provides equivalent functions to the control plane functions of the SGSN and GGSN from the 3G architecture (3GPP Release-6). The MME handles security key management. The MIME also provides control plane function for mobility between LTE and GSM/UMTS networks. Communications between the eNodeB 5 are transmitted to the MME 7 via the S1-c Interface 4.

A user plane entity (UPE) 9 handles the user plane traffic functions from the terminal 1 which includes the IP header and payload compression and ciphering.

This UPE 9 provides the equivalent functions to the user plane part of the 3G RNC and the user plane part of the 3G GGSN. Communications between the eNodeB 5 are transmitted to the UPE 7 via the S1-u Interface 6.

It should be noted that, although in FIG. 1 the MME 7 and UPE 9 are shown as separate logical entities they may exist as a single physical node of the telecommunications network, i.e. as a single gateway (GW) 8. Data are transmitted between the eNodeB 5 and the MME 7 and UPE 9 via IP transport network 11.

E-UTRAN is the air interface for LTE/SAE which uses Orthogonal Frequency Division Multiple Access (OFDMA) in the downlink (eNB to terminal) and Single Carrier Frequency Division Multiple Access (SC-FDMA) in the uplink, with the downlink and uplink transmissions organized into radio frames with 10 ms duration. In LTE, two radio frame structures are supported, being Type 1, which is applicable to FDD and Type 2 applicable to TDD. For frame structure Type 1, which is illustrated in FIG. 2, each 10 ms radio frame is divided into ten equally sized sub-frames. Each sub-frame consists of two equally sized slots. For FDD, 10 sub-frames are available for downlink transmission and 10 sub-frames are available for uplink transmissions in each 10 ms interval. Uplink and downlink transmissions are separated in the frequency domain.

For frame structure Type 2, as illustrated in FIG. 3, each 10 ms radio frame consists of two half-frames of 5 ms each. Each half-frame consists of eight slots of length 0.5 ms and three special fields: DwPTS (Downlink Pilot Time Slot), GP (Guard Period) and UpPTS (Uplink Pilot Time Slot). The length of DwPTS and UpPTS is configurable subject to the total length of DwPTS, GP and UpPTS being equal to 1 ms. All other sub-frames consist of two equally sized slots. Uplink and downlink transmissions are separated in the time domain. These frame structures are applicable to frequency division duplex (FDD)—the use of frequency-division multiplexing to separate outward and return signals—and time division duplex (TDD)—the use of time-division multiplexing to separate outward and return signals.

As mentioned above, data are transmitted in the downlink (DL) by OFDMA. According to OFDMA the available frequency spectrum is divided into several sub-carriers where the resources are partitioned in a time-frequency space, and slots are assigned along an OFDM symbol index and OFDM sub-carrier index. The size of the sub-channels is usually chosen such that it is within the coherence bandwidth. To maximise spectral efficiency, the frequency responses of the sub-carriers are overlapping and orthogonal. The OFDMA are organised into frames of 10 ms duration.

L2 transparent relay has been studied in 3GPP RAN1 as a candidate technology for LTE Advanced. LTE-Advanced extends LTE Rel-8 with, inter alia, support for relaying as a tool to improve the coverage of high data rates, group mobility, the cell-edge throughput and/or to provide coverage in new areas. In this regard, the discussions have been in relation to potentially introducing a type of transparent L2 relay. The relay is ideally transparent in order to be backward compatible with Rel-8 UEs.

System Context of the Transparent Relay

In the context of the proposed transparent relay, the RN will be properly located so that the eNB-RN link is of good quality and preferably also to improve an area not well covered by the donor eNB. The RN monitors the signalling exchange between the donor eNB and the targeted UEs, so that the RN is aware of scheduling information and HARQ acknowledgement information exchanged between a UE and the donor eNB. The RN's good geometry in the donor eNB cell enables it to decode at the early phase of a HARQ process for targeted relay UEs. The RN will then be able to contribute in later HARQ transmissions by synchronized retransmission for the UE with the eNB. In this way, the RN effectively increases the signal strength transmitted between eNB and UE. As a transparent relay (i.e. to the UE), the RN does not send Cell specific Reference Signal (CRS) and therefore does not have any physical cell identity. In other word, the RN behaves like a $3^{rd}$ party "agent" intercepting communications between UE and eNB, and trying to help the communication by participating in the HARQ retransmissions in uplink or downlink or both.

Pre-Scheduling for Synchronous HARQ Transmission

In the context of this type of relay, in the downlink a relay UE will see, in a sub-frame where HARQ retransmission occurs, the control symbols from eNB and PDSCH (Physical Downlink Shared Channel) symbols from RN or from both RN and eNB. Accordingly, the time-frequency resources need to be synchronized for the RN, donor eNB and UE (i.e. the transmission time and frequency carriers need to be the same at retransmission). Similarly such synchronization needs to be maintained in the uplink. To achieve synchronization in retransmission for the RN with the eNB (in downlink) or with the UE (in uplink), this invention, in one aspect, provides pre-scheduling for synchronous HARQ retransmission.

According to a first embodiment of the invention, synchronous HARQ transmission means that once the first HARQ transmission is decided, later HARQ retransmissions will follow a pre-defined pattern in the time-frequency resource plane. That means, to schedule such synchronous HARQ transmission, the eNB at (or before) the first transmission also effectively schedules the subsequent retransmissions for that HARQ process in pre-arranged resources obeying a common HARQ retransmission pattern known also by the RN, so that the RN, once having decoded the data at the early phase of the HARQ transmission, can pre-schedule exactly the same HARQ retransmission at the same time-frequency resources (i.e. identically to the schedule planned at eNB).

Figure 5:
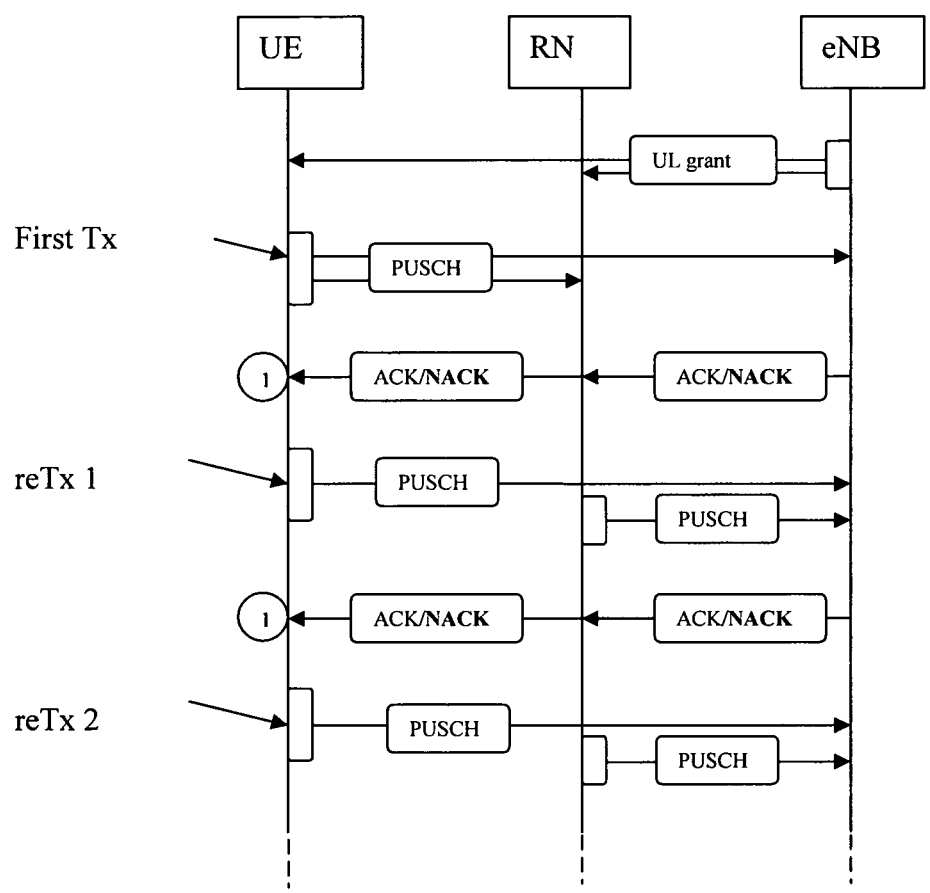
FIG. 5 illustrates a signalling diagram for a retransmission from a mobile terminal using a relay, useful for explaining the embodiments of the invention.

Signalling diagrams of this retransmission technique in the downlink and the uplink are provided in FIGS. 4 and 5 respectively. Retransmission is on the condition of a NACK (Negative Acknowledgement) being detected from the UE for a RN decoded transmission. Upon detecting a NACK, the RN will assist by synchronized retransmission of the same waveform at the same resources for the subsequent HARQ retransmission. The source of the data can be either an eNB in the case of downlink transmission (FIG. 4) or a UE in the case of uplink transmission (FIG. 5).

A TDM (Time Division Mode) constraint applies to this type of transparent relay, because the RN should not listen and transmit at the same time for a given time-frequency resource due to difficulty in antenna isolation for the transmitting and receiving directions at the RN. This TDM constraint therefore requires that the RN be in receiving mode in the Relay sub-frame where the first HARQ transmission(s) is/are scheduled, and to be in transmitting mode in the sub-frame where retransmission is scheduled the RN. To meet such TDM constraints, sub-frame patterns should be designed so that in a defined set of sub-frames where the RN is listening (i.e. in the RN Receiving Sub-Frame (R-R-SF) set), and in a set of subsequent sub-frames where the RN is transmitting (i.e. the RN Transmitting Sub-Frames (R-T-SF) set) the transmitting and receiving sub-frames occur in a fixed pattern, typically with a period corresponding to the HARQ retransmission interval (i.e. typically greater than Round Trip Time). For the TDM constraint, the R-R-SF set shall not overlap with the R-T-SF set.

The design of sub frame patterns for R-R-SF and R-T-SF depend upon planning issues such as how much resources can be used for relay assisted traffic. In particular, it has been advantageously determined that valid sub-frame patterns depend on both the set of sub-frames selected for R-R-SF and the maximum number of HARQ transmission (M) for RFT. A variety of sub-frame patterns as well as the mechanisms to derive those sub-frame patterns will be described further below.

Determining RN UE Groups

A RN UE refers to the UE whose transmission with the donor eNB is assisted by one or more RN nodes. As each RN has to work in a TDM (Time Division Mode) to transmit and to receive at a given frequency band, this will result in less access to resources at the RN than that at a donor eNB. Thus the RN will likely not be able to support transmissions for all connected eNB UEs in a highly loaded eNB cell. Therefore, ideally, the RN is associated with a group/set of RN UEs, by identifying the UEs that need help from the RN. This can be done in a number of ways, including by identifying the UEs with the greatest "needs", as indicated by those with a high HARQ retransmission rate from the eNB. A threshold can be defined to decide whether a UE should join and/or be removed from a particular UE group. An alternative way to identify "targeted" UEs can be based on how efficiently the RN can help the UEs. The decision of UE groups should be made by eNB with or without additional information provided by RN. With the UE group information provided to the RN by the donor eNB, the RN would then only need snoop (i.e. watch) the signalling relevant to their particular set of UEs.

Configuration of RN on Pre-Scheduling Patterns for Synchronous HARQ

The eNB manages which sets of UEs are allocated to each RN for the purposes of retransmission. In this regard, the eNB should keep the RNs up-to-date with the sets of RN UEs allocated to them as well as any further applicable information on the sets of RN users. The information should be sufficient for each RN to snoop (i.e. watch) the signalling exchange between a targeted UE and the donor eNB, and should be sufficient for the RN to pack RBs (Resource Blocks) for retransmission. Each RN should update the donor eNB with the RN UE status perceived at the RN in case that the eNB needs to update any of the RN UE groups. The eNB may also explicitly update the RN with Sub-Frame patterns of R-R-SF and R-T-SF.

The eNB should configure each RN with one or more patterns for R-R-SF and R-T-SF. With this pattern information given, the number of HARQ retransmission needed and where the retransmission(s) is/are to occur for a RN UE can be implicitly derived from the sub-frame number of the R-R-SF where the HARQ transmission is received by the RN.

Link Adaptation

The eNB can also use the retransmission rate to perform link adaptation. In this regard, it is to be appreciated that the standard link adaptation techniques are not available for a network configuration including this type of relay, as the measurements are not appropriate (e.g. the reported CQI (Channel Quality Indication) is based on the eNB-UE link as if no RN is present. Also as no CRS (Cell-specific Reference Signal) is transmitted by the RN, the RN-UE link or the combined links by eNB-UE and RN-UE cannot be directly measured.) In this case the link adaption based on observation of block error rate can be used. For example, considering a poorly located UE, where the initial link quality on eNB-UE is poor, the transmission is started with a low data rate (i.e. using a conservative Modulation and Coding Scheme (MCS)) which yields a high Block Error Rate (BLER) and a high retransmission rate. For that reason, the UE is added to a UE-RN group. With the help of the RN, the BLER and the average number of HARQ retransmission is reduced. It has been found that ideally the average number of HARQ retransmissions is of the order of 2, as this maximises the data rate. Therefore, if the average number of retransmissions is less than 2, the eNB should try to increase the MCS stepwise until just before the number of retransmissions exceeds 2 again.

Synchronization of RN with eNB in Time and Frequency

To support the HARQ retransmission assisted by RNs, each RN has to be synchronized with the applicable donor eNB in both time and frequency. In the time domain, the sub-frame boundary should be aligned with the received copy of eNB sub-frame. This is applies to a UE in order to obtain synchronization with an eNB in both the uplink (UL) and the downlink (DL). This will ensure that, in the downlink for instance, the OFDM symbols received by the RN UE from the RN and the donor eNB fit into the cyclic prefix as the RN is typically a low power node and corresponds only for a small coverage with radius of ten's of meters. In uplink, the same analysis applies.

Demodulation Using UE Specific Reference Signal

According to a first embodiment of the invention coherent demodulation is employed. To ensure coherent demodulation, a demodulation signal is utilised, which travels through the same path as each Resource Block (RB) carrying relay-assisted data. This demodulation signal is UE specific (as opposed to network specific), and is utilised in the downlink to enable coherent demodulation of the PDSCH at the UE (i.e. the signal is a UE-specific reference signal included in the scheduled RBs). In this way, the eNB for example can inform RN UE to work in transmission mode 7 as defined in 3GPP R8. This also allows a Release 8 UE, through the use of a DRS (Dedicated Reference Signal) to be supported by such a relay in the downlink. The pattern and other required specifications of the DRS can be the same as that used for BF (beam forming) in LTE R8, and should be applied in both the eNB and the RN for the targeted UE. Further optimisation in the new transmission mode and/or demodulation reference signal pattern for this type of relay is possible.

In the uplink, a demodulation signal for PUSCH (Physical Uplink Shared Channel) as defined in R8 is already UE specific, so the RN simply needs to regenerate the identical demodulation reference signal as the UE does for the retransmission of a PUSCH.

Description of Relay in Uplink

As described above, an embodiment of the invention seeks to ensure that any retransmissions involving the RN are synchronous. In this regard, UL HARQ retransmission in LTE is synchronous. For LTE FDD, the period for a retransmission to occur is 8 ms; this period is called RTT (Round Trip Time). For LTE TDD, the period is 10 ms.

To support the RN receiving and transmitting in TDM, a first transmission of RFT (Relay Facilitated Traffic) data should be scheduled in a fixed set of Sub-Frames, and the retransmission Sub-Frame is determined in a periodical pattern of 8 ms. The set of R-R-SF and R-T-SF should be designed to meet the above HARQ pattern, i.e. R-R-SF should correspond to the first phase of HARQ transmission, typically the first transmission, and the R-T-SF should correspond to a later phase of HARQ transmissions in time with the period of the fixed RTT.

Therefore, in the UL, the RN should try to decode UL grant for the RN UE in order to obtain the DL control symbols for the PUSCH transmissions to occur in R-R-SF (see FIG. 5), and prepare to receive PUSCH in the specified resources. In this regard UL grant contains the resource allocation information and other specifications of the PUSCH. If the RN successfully decodes the PUSCH, the RN will be able to perform retransmission as scheduled in the same HARQ retransmission pattern as for the RN UE. That is, when the RN decodes the transmission of PUSCH in an R-R-SF (i.e. the First Tx in FIG. 5), the retransmission data should be scheduled in the subsequent R-T-SF sub frames obeying the same synchronous HARQ pattern (i.e. as per reTx1 and reTx2 in FIG. 5). For example, if Chase Combining is used for the HARQ process, the retransmission could duplicate the same waveform as the first transmission at the same Resource Block positions in the R-T-SF sub frames.

Again referring to FIG. 5, it is to be appreciated that at "1", if an ACK is received, then the retransmission will be cancelled. It will only be where the eNB transmits a NACK that retransmission will be triggered.

The RN in PUSCH retransmission almost mirrors the operation of the RN UE, except that the uplink control information (i.e. PMI/RI/CQI and ACK/NACK) is missing. This is because PUSCH can be multiplexed with uplink control channels, and the RN has no way of knowing what control information would be multiplexed at the UE. Resource Blocks potentially occupied by control channel data should therefore be punctured (muted) when the RN packs the RB for UL retransmission. The PUSCH retransmission should also be scheduled to avoid collision with ACK/NACK in the R-T-

SF sub-frame for RN UE. This will be addressed later in the embodiments of this invention by design of proper sub-frame patterns for relay.

Further, by informed scheduling, the RN can avoid RBs containing PMI/RI/CQI reports. For instance, this can be easily done by choosing a proper reporting period, and using those uplink sub-frames not allocated for relay.

RN should send the same demodulation reference signal as the UE for that PUSCH in retransmission, so that the demodulation of the PUSCH can be done at eNB.

The RN should snoop downlink control symbols for the RN UE in order to detect the ACK/NACK corresponding to the interested HARQ transmissions in uplink. If ACK from eNB is received for the RN UE, there is then no need to retransmit, and the RN should discard the corresponding pre-scheduled HARQ retransmission(s) from the pre-scheduled sub-frames, thereby making the corresponding Resource Blocks free for alternative uses. This is illustrated in FIG. 5. If NACK is detected, no particular action is needed since the pre-scheduling for the retransmissions in R-T-SF sub-frames has been made ready immediately after the successful reception during a R-R-SF sub-frame occurred previously at RN.

Description of Relay in Downlink Transmission

LTE downlink HARQ transmission is not naturally synchronous, i.e. the eNB always explicitly signals the UE for HARQ transmission on the PDSCH. To adapt to the TDM constraints of the RN, the eNB should reinforce synchronous HARQ transmissions, even though downlink assignment is always explicitly given from eNB, and LTE UEs are configured to always assume explicit downlink assignment. Synchronous scheduling can be applied similarly as above for UL, by identifying a set of sub frames for $1^{st}$ transmission, or transmission intended for RN to receive, and the subsequent SFs in periodicity of 8 ms for FDD (10 ms for TDD) for retransmission. As PDSCH transmissions are always accompanied by explicit downlink assignment information, it should be understood that, in the downlink, the period is not restricted to 8 ms or 10 ms, nor to fixed intervals, as long as a static HARQ transmission pattern can be agreed and followed between eNB and RN.

Unlike in the uplink, where the UE and RN transmit together in retransmission, for the downlink there is one more option, namely where the eNB transmits only a DL assignment without the corresponding PDSCH at retransmission when RN is assisting (i.e. only the RN performs the retransmission). This is illustrated in FIG. 4 (i.e. the dashed lines indicate an optional transmission by the eNB). Therefore, a RN UE will always receive PDCCH (Physical Downlink Control Channel) symbols from its donor eNB, and PDSCH from the RN or from both the RN and eNB.

The same mechanism as for uplink should be applied as well at the RN to pre-schedule the retransmissions in subsequent R-T-SF once a transmission of a PDSCH is successfully decoded from R-R-SF for a RN UE. And upon ACK being detected for that HARQ process, the RN should discard the corresponding resources in subsequent R-T-SF. If NACK is detected, the pre-scheduling will make sure the synchronization between eNB and RN for retransmission of PDSCH for a RN UE and the transmission of the corresponding control symbols (PDCCH).

Triggers of Relay Operation to a UE

It is to be appreciated that in these examples in the UL and DL, whether the RN assists a UE with retransmission depends on whether the following conditions (at least) are met:
the UE belongs to the RN UE group;
the RN successfully decodes the transmission in R-R-SF; and
no ACK is received for the transmission at the instance of the ACK/NACK timing.

Sub-Frame Patterns for Relay

It is also to be appreciated that there can be two categories of traffic in the cell of an eNB, namely traffic facilitated by a RN (RFT) and traffic not facilitated by a RN (NRFT). The synchronous scheduling examples given above relates to RFT. NRFT data on the other hand has the freedom to be scheduled in any sub frame and does not need to follow the synchronous scheduling described for RFT. The NRFT data can of course be scheduled to use the resources in a sub-frame reserved for RFT, when that sub-frame is not occupied by RFT. This will ensure efficient use of the resources scheduled for relay usage. Nevertheless, in order to load balance between RFT and NRFT, various combinations of relay receiving sub-frames in a radio frame can be chosen. It is also to be appreciated that there is also some freedom in DL to schedule the first transmission, so as to make it possible to arrange patterns with no-constant HARQ retransmission interval for RFT.

Constraints in SF Pattern Design

In the following Sub-Frame design discussion we will give SF patterns for R-R-SF and R-T-SF with the following constraints:

TDM constraints: R-R-SF set should not overlap with R-T-SF set;

ACK/NACK multiplexing avoidance: PUSCH for RN UE should not be multiplexed with ACK/NACK;

System sub-frame avoidance: in LTE FDD, system information is transmitted in sub frame numbers #0, #4, #5 and #9, and LTE TDD, it is transmitted in sub frame numbers #0, #1, #5 and #6. These sub-frames shall not be assigned as R-T-SF, as they contain synchronization channels, system broadcasting channels and other important information the RN needs to listen to.

In the uplink, the HARQ retransmission interval is fixed to be 8 ms for LTE FDD and 10 ms for LTE TDD. In downlink, we will assume for ease of illustration that for synchronous HARQ the retransmission interval is also 8 ms for LTE FDD and 10 ms for TDD to align respectively with the uplink counterpart, although as mentioned above that HARQ retransmission interval does not have to be fixed as downlink assignment is explicitly given.

Relay Sub-Frame Patterns for LTE FDD System

With constraints on TDM and system sub-frame avoidance, as mentioned above, being taken into account, at least the following basic patterns are valid:

$$p8=\{8:6\}$$
$$p4=\{4:2\}$$
$$p0=\{0:8\} \text{ or } p0'=\{0:8,6\}$$
$$p9=\{9:7\}$$
$$p5=\{5:3\} \text{ or } p5'=\{5:3,1\}$$
$$p3=\{3:1\} \quad \text{Eqs. (1)}$$

For example in pattern 5' (p5'), the set {5: 3, 1} denotes a basic pattern that SF#5 is a relay receiving sub-frame, and SF#3 and SF#1 are valid transmitting sub-frames in consecutive radio frames. These patterns maintain the FDD periodic pattern of 8 ms (i.e. repeating sub-frames #0 to #9). To illustrate, considering pattern 8 (p8), where SF#8 is chosen as the relay receiving frame, the next sub-frame within the periodic pattern (i.e. 8 sub-frames later) is SF#6 in the next frame. A further period from SF#6 would bring us to SF#4 in the next frame. SF#4, however is a sub-frame reserved for downlink system signals, and accordingly cannot be used as a relay transmitting frame. Hence the p8 pattern only lists sub-frame #6 as a possible relay transmitting slot and not SF#4. For example, any combination of the above basic patterns with different R-R-SF SF# is still a valid pattern for R-R-SF and R-T-SF. Therefore SF#0 and SF#5 are suitable for using as first receiving sub-frames where two retransmissions are likely to be required. The remaining SFs listed in Eqs. (1) are suitable where only one retransmission is likely to be required.

As an illustrative FDD example in the downlink, consider the design requirements of three sub-frames per radio frame to be reserved for R-R-SF, and among them, 2 sub-frames to be reserved for UEs where the Maximum number of HARQ retransmissions (M) is 3 and 1 sub-frame for UEs where M=2. This variation in the maximum of number of retransmissions is reasonable since for different UEs associated with a given RN, the level of help required is likely to be different, as they may perceive different cell coverage or interference. To meet these requirements, with reference to the FDD patterns of Eqs. 1, for the R-R-SF, SF#5 and SF#0 can be chosen for M=3 and SF#4 for M=2. This is summarised in Table 1:

TABLE 1

|  | SF# |
|---|---|
| R-R-SF | 0, 4, 5 |
| R-T-SF | 1, 2, 3, 6, 8 |

That is, with sub-frames 0, 4 and 5 reserved for the RN to receive data intended for UEs associated with the RN, the transmitting sub-frames allocated for any necessary retransmissions are sub-frames 1, 2, 3, 6 and 8. These sub-frames for retransmission are derived from the patterns shown in Eqs. (1) above p0'={0: 8, 6} (for two retransmissions), p4={4:2}(for one retransmissions) and p5'={5: 3, 1} (for two retransmissions)).

Table 2 illustrates how these reserved sub-frames would be made available to the RN in successive radio frames:

TABLE 2

|  | RF#n | RF#n + 1 | RF#n + 2 |
|---|---|---|---|
| R-R-SF# | 0, 4, 5 | . . . | . . . |
| 1stR-T-SF# | 8 | 2, 3 | . . . |
| 2ndR-T-SF# | . . . | 6 | 1 |

In the first radio frame (i.e. RF#n) the RN would look to three reserved sub-frames to receive data from the eNB intended for e.g. the three associated UEs, being UE1 in SF#0, UE2 in SF#4 and UE3 SF#5. The RN will then monitor the responses from the 3 UEs, all due within the FDD period of 4 ms on ACK/NACK (i.e. the UEs are configured to send data in an UL sub-frame 4 ms later) and 8 ms for retransmission. For R-R-SF#0, this period ends on SF#8, the first corresponding reserved frame for retransmission. As shown in Table 2, SF#8 is the first frame in which the RN may retransmit for UE1, and also occurs in the first radio frame, RF#n (i.e. the same RF as the allocated receiving sub-frame). In the next radio frame, RF#n+1, the first retransmission for R-R-SF#4 in RF#n and R-R-SF#5 in RF#n occur (i.e. for UE2 and UE3 respectively), being SF#2 and SF#3. SF#2 is 8 ms from SF#4 and SF#3 is 8 ms from SF#5. The second retransmission sub-frame for UE1 is SF#6, which also occurs in RF#n+1 (i.e. this second retransmission sub-frame occurs 8 ms after its corresponding first retransmission sub-frame, SF#8 which occurred in RF#n). And finally, the second retransmission sub-frame for UE3 is SF#1, which occurs in RF#n+2 (i.e. this second retransmission sub-frame occurs 8 ms after its corresponding first retransmission sub-frame SF#3, which occurred in RF#n+1).

A further design consideration is to consider the constraint on ACK/NACK avoidance. An example will be given in the following and then procedures devised to define suitable sub-frame patterns with for both UL and DL with all constraints discussed so far being met.

Where the scheduling patterns of Eqs (1) are being used, these ACK/NACK SFs in the uplink can be readily derived and effectively "blacklisted" for use as a RN transmitting frame. To illustrate, with reference to Table 2, where three different patterns are being simultaneously utilised, namely p5', p0' and p4, the following SF need to be reserved for ACK/NACK reception:

p5': 1st R-SF is SF#5, so the corresponding ACK/NACK to be reserved is SF#9
    $1^{st}$ T-SF is SF#3, so the subsequent ACK/NACK to be reserved is SF#7
    $2^{nd}$ T-SF is SF#1 so the subsequent ACK/NACK to be reserved is SF#5
p0': $1^{st}$ R-SF is SF#0 so the corresponding ACK/NACK to be served is SF#4
    $1^{st}$ T-SF is SF#8, so the subsequent ACK/NACK to be reserved is SF#2
    $2^{nd}$ T-SF is SF#6 so the subsequent ACK/NACK to be reserved is SF#0
p4: $1^{st}$ R-SF is SF#4 so the corresponding ACK/NACK to be served is SF#8
    $1^{st}$ T-SF is SF#2, so the subsequent ACK/NACK to be reserved is SF#6

Therefore, these patterns show that for p5' the cyclic sequence of {9,7,5,3,1} applies and that for p0' the cyclic sequence of {0,8,6,4,2} applies. The "blacklist" in UL is therefore {8,7,6,5,4,2,0}. It can be found out that {3, 1} is not colliding with any ACK/NACK sub-frame, therefore can be used for relay UL transmission, i.e. in UL #5 is used for R-R-SF/$1^{st}$ HARQ transmission, and #3 and #1 are used respectively as R-T-SFs respectively for the $2^{nd}$ transmission and the $3^{rd}$ transmission. These are just illustrations, and other pattern combinations are possible.

It is feasible to find out all viable patterns ("viable patterns" here means uplink and downlink sub-frame patterns that meets all those constraints discussed above) by the following steps:

1. to settle a candidate DL SF pattern for RN SF according to the method introduced in the FDD section on scheduling pattern design, as described above; and
2. check the corresponding ACK/NACK UL SF numbers, if one or more valid sequence(s) can be identified not timed for ACK/NACK, then the identified SF sequence can be used for UL R-SF; else if no sequence can be identified then go to step 1. The valid sequence will be any subsequence with at least 2 entries from either the set of cyclic sequence of {9, 7, 5, 3, 1} or the set of cyclic sequence of {0, 8, 6, 4, 2}. The "cyclic" here means e.g. {1, 9} or {4, 2, 0} is a valid sub sequence.

To further illustrate preferred embodiments of the invention, the various sub-frame patterns in a Radio Frame (RF) that are viable for first HARQ transmission for Relay UE will be explored for FDD. In the following RTT=8 ms is assumed. It is intended in the following to identify all viable sub-frame patterns for relaying with LTE FDD system. We also derive parameter-and-value pair to efficiently communicate to a RN for sub-frame patterns to be configured.

In this regard, consider the split of the set of sub frame numbers S={0, 1, 2, 3, 4, 5, 6, 7, 8, 9} into:
a sub-set O={1, 3, 5, 7, 9} for odd numbers; and
a sub-set E={0, 2, 4, 6, 8} for even numbers.

A radio frame is therefore split into two orthogonal sub frame sets O and E.

The definition of O(n) is:
If and only if one sub frame is reserved from the set O for $1^{st}$ transmission of RFT, and the maximum number of transmission allowed is n during a HARQ process, then the viable sub frame number SF# is given in set O(n). Each element of O(n) is an integer chosen from set O.
e.g. O(2)=O(3)=O(4)=O(5)={1, 3, 5, 7, 9}

The definition of O(m, n) is:
If and only if two sub frames are reserved from the set O for $1^{st}$ transmission of RFT, and each element of O(m, n) is a pair of integers (k, l) representing a pair of sub frames. k denotes the sub frame number where the first transmission of RFT is scheduled corresponding to a HARQ process with maximum number of transmissions equal to m. l denotes the sub frame number where the first transmission of RFT is scheduled corresponding to a HARQ process with maximum number of transmissions equals to n.
e.g. O(2,3)={(i,(i+6)|8), i=1, 3, 5, 7, 9}
O(2,2)={(i, (i+4)|8), i=1, 3, 5, 7, 9}∪{(i, (i+6)|8), i=1, 3, 5, 7, 9}

The definition of E(n) is:
If and only if there is one sub frame reserved per set E for $1^{st}$ transmission of RFT, and the maximum number of transmissions allowed is n during a HARQ process, then the viable sub frame number SF# is given in set E(n). Each element of E(n) is an integer chosen from set E.
e.g. E(2)=E(3)=E(4)=E(5)={0, 2, 4, 6, 8}

The definition of E(m, n) is:
If and only if two sub frames are reserved from the set E for $1^{st}$ transmission of RFT, and each element of E(m, n) is a pair of integers (k, l) representing a pair of sub frames. k denotes the sub frame number where the first transmission of RFT is scheduled corresponding to a HARQ process with maximum number of transmissions equals to m. l denotes the sub frame number where the first transmission of RFT is scheduled corresponding to a HARQ process with maximum number of transmissions equals to n.
e.g. E(2,3)={(i,(i+6)|8), i=0, 2, 4, 6, 8}
E(2,2)={(i, (i+4)|8), i=0, 2, 4, 6, 8}∪{(i+6)|8), i=0, 2, 4, 6, 8}

For example, an element of E(2,3) implies the following:
In sub-frame set E, there are only two sub-frames allocated for R-R-SF
the E(2,3) consists of all sub-frames pairs (k, l) can be used for R-R-SF, and respectively k is the sub-frame number of the R-R-SF corresponding to a maximum HARQ number of transmissions equalling to 2; l is the sub-frame number of the R-R-SF equalling to 3.

To span E(2,3) into instances, E(2,3)={(0,6), (2,0), (4,2), (6,4), (8,6)} where e.g. (0,6) corresponding to the HARQ pattern of (#0 for R-R-SF/$1^{st}$ transmission, #8 for R-T-SF/$2^{nd}$ transmission) and (#6 for R-R-SF/$1^{st}$ transmission, #4 for R-T-SF/$2^{nd}$ transmission, #2 for R-T-SF/$3^{rd}$ transmission)

It should be understood that a transmission started from set O will have subsequent retransmission only in O. And the same principle applies to E. This means any combination of an element from any E sub-set and an element from any O sub-set will result in a set of sub-frame numbers that is viable for first transmission of RFT with the specified maximum number of HARQ transmissions.

For example, consider the design requirements where three sub frames per radio frame need to be reserved for $1^{st}$ transmission of RFT, and among them one sub frame is for M=4, one sub frame is M=3 and one sub frame is for M=2. This is reasonable since for different UEs the level of help needed from a RN is expected to be different, as each may perceive different cell coverage or interference.

This design requirement can be met by choosing sub frame #0 from E(4) for M=4, and (SF#3, SF#9) from set O(2,3) for M=2 and M=3 respectively. This is illustrated in Table 3, applying the patterns from Eqs (1) applicable to SF#0, 3 and 9 being first RN receiving SFs:

TABLE 3

|  | RF#n | RF#n + 1 | RF#n + 2 |
|---|---|---|---|
| $1^{st}$ R-SF# | 0, 3, 9 | ... | ... |
| $2^{nd}$ R-SF# | 8 | 1, 7 | ... |
| $3^{rd}$ R-SF# | ... | 6 | 5 |
| $4^{th}$ R-SF# |  |  | 4 |

In an actual implementation, the donor eNB need simply inform this RN with the following information in parameter-and-value pairs for the sub-frame configurations;
E(4)=SF#0
O(2,3)=(SF#3, SF#9)

The following Table 4 is a further example of applicable sub-frame patterns, where for E(4), SF#8 is chosen for the $1^{st}$ receiving sub-frame:

TABLE 4

|  | RF#n | RF#n + 1 | RF#n + 2 | RF#n + 3 | RF#n + 4 | ... |
|---|---|---|---|---|---|---|
| 1st R-SF# | 8 | 8 | 8 | 8 | 8 | ... |
| 2nd R-SF# | ... | 6 | 6 | 6 | 6 | ... |
| 3rd R-SF# | ... | ... | 4 | 4 | 4 | ... |
| 4th R-SF# | ... | ... | ... | 2 | 2 | ... |

The following Table 5 is a further example of applicable sub-frame patterns, where for E(4) and O(4) a combination of SF#3 and SF#8 respectively are chosen for the first receiving SF:

TABLE 5

|  | RF#n | RF#n + 1 | RF#n + 2 | RF#n + 3 | RF#n + 4 | ... |
|---|---|---|---|---|---|---|
| 1st R-SF# | 3, 8 | 3, 8 | 3, 8 | 3, 8 | 3, 8 | ... |
| 2nd R-SF# | ... | 1, 6 | 1, 6 | 1, 6 | 1, 6 | ... |
| 3rd R-SF# | ... | 9 | 9, 4 | 9, 4 | 9, 4 | ... |
| 4th R-SF# | ... | ... | 7 | 7, 2 | 7, 2 | ... |

Relay Sub-Frame Patterns for LTE TDD System

For TDD, a slightly different approach is taken since the RTT period 10 ms is assumed for uplink and downlink that is align with LTE TDD radio frame period. Therefore, in TDD, if a sub-frame is allocated as a relay receiving sub-frame, then the same sub-frame number at the next radio frame and a number of subsequent radio frames will be reserved as relay transmitting sub-frames. The number of subsequent radio frames reserved is dependent on M, the maximum number of HARQ retransmissions. More specifically, if a SF# is set to be a relay receiving sub-frame in a radio frame, and M is the maximum number of HARQ retransmissions, then the same SF# in subsequent M−1 radio frames should be reserved as relay transmitting sub-frames. Therefore, in TDD, each sub-frame can effectively be viewed as an independent HARQ trail resource.

Table 6 shows TDD UL/DL configurations:

TABLE 6

| Uplink-downlink configuration | Downlink-to-Uplink Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Considering the system sub-frame constraints, the valid set of usable sub-frames for TDD in either the uplink or downlink is:

$$V=\{2,3,4,7,8,9\} \qquad \text{Eq. (2)}$$

As for the TDM constraints, it is to be appreciated that if a SF# is set as relay receiving sub-frame (R-R-SF), and the maximum number HARQ retransmission is M, then this SF# will not be available as a relay receiving sub-frame in the subsequent M−1 radio frames (since it is reserved as a relay transmitting sub-frame in those radio frames). The ACK/NACK constraint applies as well.

With all those constraints, an illustrative TDD example is shown in Table 7 suitable for LTE TDD UL/DL configuration 4 where only SF#2 and SF#3 are allocated for UL:

TABLE 7

| RF# | ... n | n + 1 | n + 2 | n + 3 | n + 4 | n + 5 | n + 6 |
|---|---|---|---|---|---|---|---|
| DL-SF#9 | ... R | T | T | R | T | T | R | ... |
| DL-SF#8 | ... T | R | T | T | R | T | T | ... |
| DL-SF#7 | ... T | R | T | R | T | R | T | ... |
| UL-SF#2 | ... R | T | T | R | T | T | R | |

The following are viable set of sub-frame patterns for scheduling data for relay UE specific to LTE TDD UL/DL configurations 1, 2, 3 and 4 (see Table 6):

DL/UL Configuration 1:
SF#2 and/or SF#7 in the UL are always viable, and/or one of the following options applies:
  Option 1: SF#9 in the DL and SF#8 in the UL
  Option 2: SF#4 in the DL and SF#3 in the UL
DL/UL Configuration 2:
One of the following options applies:
  Option 1: SF#4 and/or SF#8 in the DL and SF#7 in the UL
  Option 2: SF#3 and/or SF#9 in the DL and SF#2 in the UL
DL/UL Configuration 3:
SF#2 and/or one of the following options
  Option 1: SF#7 and/or SF#8 in the DL and SF#4 in the UL
  Option 2: SF#9 in the DL and SF#3 in the UL
DL/UL Configuration 4:
One of the following options is viable:
SF#7 and/or one of the following options
  Option 1: SF#8 in the DL and SF#2 in the UL
  Option 2: SF#4 in the DL and SF#3 in the UL With these examples we have shown how scheduling patterns in FDD and TDD can be utilised to enable the use of a L2 transparent RN in an LTE and LTE-Advanced network.

The embodiments of the invention described are to be taken as illustrative of the invention, and not limitative. For instance, the embodiments have been described with particular application to LTE Rel-8 and/or LTE Advanced, and particularly in regard to their usage of transparent L2 relays employing coherent transmission and synchronous HARQ transmissions. However the embodiments may equally be applied to any network configured to utilise relay nodes and/or HARQ such as that described in IEEE 802.16m (Wi-MAX Advanced Air Interface).

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, and/or a combination of software and hardware. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. In a telecommunications network including a mobile terminal in communication with a network base station, and at least one relay node configured to assist the base station with downlink data transmissions towards the mobile terminal, a method of enabling coherent demodulation of a scheduled data block transmitted in the downlink by the base station and the at least one relay node, the method comprising:
   determining that the scheduled data block is to be transmitted to the mobile terminal via the at least one relay node; and
   after determining that the scheduled data block is to be transmitted to the mobile terminal via the at least one relay node, providing a reference signal in the scheduled data block which is configured to change the mobile terminal from using cell specific reference signalling to using mobile terminal specific reference signalling, by instructing the mobile terminal to operate in an appropriate 3GPP transmission mode, in order to enable the mobile terminal to demodulate the scheduled data block transmitted in the downlink by the at least one relay node and the base station, wherein the processor is further configured to communicate pre-scheduling information to the relay node, such that the pre-scheduling information defines the parameters for any required synchronous retransmission of a first data transmission by the base station.

2. The method of claim 1, wherein the network base station is an eNode B and the telecommunications network conforms to 3GPP LTE and the reference signal provided is a Dedicated Reference Signal (DRS) as defined in 3GPP Release 8.

3. The method of claim 1, further comprising:
transmitting pre-scheduling information for any required synchronous retransmission of a first data transmission by the relay node and a transmitting entity.

4. The method of claim 3, wherein the pre-scheduling information is transmitted with the first data transmission.

5. The method of claim 3, wherein the pre-scheduling information is implicitly derivable from the sub-frame number used for the first data transmission with a pre-defined retransmission pattern being configured to the relay node.

6. The method of claim 3, wherein the pre-scheduling information comprises an indication of a periodic sub-frame pattern that ensures any retransmissions occur in phase with an applicable HARQ retransmission process.

7. The method of claim 3, wherein the pre-scheduling information comprises an indication of a sub-frame pattern that is dependent upon the sub-frame used for the first data transmission and the maximum number of HARQ retransmissions.

8. The method of claim 3, wherein the pre-scheduling information is an indication of a sub-frame pattern for ensuring synchronisation of the transmission time and frequency carriers for any required retransmission by the relay node and/or the transmitting entity.

9. The method of claim 3, wherein:
the first transmission of data is in the downlink direction, such that the transmitting entity is the base station and the intended recipient is the mobile terminal; or
the first transmission of data is in the uplink direction, such that the transmitting entity is the mobile terminal and the intended recipient is the base station.

10. The method of claim 3, wherein the network is in accordance with 3GPP LTE, the base station is an eNode B and retransmission is performed using synchronous HARQ transmission according to one or more of the following {relay receiving sub-frame:relay transmitting sub-frame(s)} patterns:

{8:6},{4:2},{0:8},{0:8,6},{9:7},{5:3},{5:3,1} and {3:1}.

11. The base station of claim 1, wherein the processor is further configured to determine an appropriate retransmission pattern and communicate the pattern to the relay node as the pre-scheduling information.

12. The method of claim 1, wherein the mobile specific reference signal is used to determine a block error rate for use in demodulating the scheduled data block.

13. The method of claim 1, wherein the at least one relay node is a transparent relay.

14. The method of claim 1, wherein the appropriate 3GPP transmission mode is transmission mode 7 in 3GPP Release 8.

15. A base station configured for use in a telecommunications network including a mobile terminal in communication with the base station, the network further including at least one relay node, configured to assist the base station with downlink data transmissions towards the mobile terminal, the base station comprising:
a processor configured to:
determine that a scheduled data block is to be transmitted to the mobile terminal via the at least one relay node; and
after determining that the scheduled data block is to be transmitted to the mobile terminal via the at least one relay node, include a reference signal in the scheduled data block, such that the reference signal is configured to change the mobile terminal from using cell specific reference signal to using mobile terminal specific reference signal, by instructing the mobile terminal to operate in an appropriate 3GPP transmission mode, in order to enable the mobile terminal to coherently demodulate the scheduled data block transmitted in the downlink by the at least one relay node, wherein the processor is further configured to communicate pre-scheduling information to the relay node, such that the pre-scheduling information defines the parameters for any required synchronous retransmission of a first data transmission by the base station.

16. The base station of claim 15, wherein the mobile specific reference signal is used to determine a block error rate for use in demodulating the scheduled data block.

17. The base station of claim 15, wherein the at least one relay node is a transparent relay.

18. The base station of claim 15, wherein the appropriate 3GPP transmission mode is transmission mode 7 in 3GPP Release 8.

19. In a telecommunications network including a mobile terminal in communication with a network base station, and at least one relay node configured to assist the base station with downlink data transmissions towards the mobile terminal, a method of enabling coherent demodulation of a scheduled data block transmitted in the downlink by the base station and the at least one relay node, the method comprising:
determining a group of mobile terminals for which the at least one relay node is assisting in the downlink of data transmissions from the base station;
triggering relay operation of the at least one relay node to assist in the downlink of data transmissions from the base station to the mobile terminal, wherein triggering the relay operation includes determining that the mobile terminal belongs to the group of mobile terminals, wherein, after the triggering of the relay operation, the at least one relay node retransmits the scheduled data block to the mobile terminal;
determining that the scheduled data block is to be transmitted to the mobile terminal via the at least one relay node;
after determining that the scheduled data block is to be transmitted to the mobile terminal via the at least one relay node, providing a reference signal in the scheduled data block which instructs the mobile terminal to change from using cell specific reference signalling to using mobile terminal specific reference signalling in order to enable the mobile terminal to demodulate the scheduled data block transmitted in the downlink by the at least one relay node and the base station; and
communicating pre-scheduling information to the relay node, such that the pre-scheduling information defines the parameters for any required synchronous retransmission of a first data transmission by the base station.

20. The method of claim 19, wherein the triggering of the relay operations further includes:
determining that the at least one relay node successfully decodes the scheduled data block received from the base station; and
determining that no acknowledgment has been received for the scheduled data block from the mobile terminal.

* * * * *